United States Patent [19]

Rafanelli

[11] Patent Number: 4,925,301

[45] Date of Patent: May 15, 1990

[54] METHOD AND APPARATUS FOR SENSING THE FIGURE OF OPTICAL ELEMENTS

[75] Inventor: Gerard L. Rafanelli, Fountain Valley, Calif.

[73] Assignee: Hughes Aircraft Company, Los Angeles, Calif.

[21] Appl. No.: 272,375

[22] Filed: Nov. 17, 1988

[51] Int. Cl.$^5$ ............................................. G01B 9/00
[52] U.S. Cl. ............................... 356/124; 250/201.1; 350/613
[58] Field of Search ............................... 356/121, 124; 250/201 R; 350/607, 608, 611, 613, 619, 620

[56] References Cited

PUBLICATIONS

Morrison, "Development Problems of the Primary Mirror for Large Space Telescopes", *SPIE Journal*, May, 1970, pp. 107-118.

*Primary Examiner*—F. L. Evans
*Attorney, Agent, or Firm*—William J. Streeter; Wanda K. Denson-Low

[57] ABSTRACT

A laser source 28 and curvature matching optics 30 cooperate to generate a probe beam 32 having a generally Gaussian phase front with a given radius of curvature. The probe beam is reflected off of the surface of a primary mirror 12 and the differences, if any, between the radii of curvature of the probe beam 32 and mirror surface is detected by detector array 38. Suitable feedback circuitry can be employed to drive the actuators of segments 16-22 to provide the mirror 12 with the desired figure.

12 Claims, 1 Drawing Sheet

METHOD AND APPARATUS FOR SENSING THE FIGURE OF OPTICAL ELEMENTS

BACKGROUND

1. Technical Field

This invention relates to optical devices and, more particularly, to techniques for sensing and controlling the figure of large segmented mirrors.

2. Discussion

There are many applications in which it is desired to measure the effective curvature or figure of an optical element or system. This is especially true for optical systems employing large segmented mirrors where it is desirable to adaptively control the shape of the individual segments and thus, the overall curvature of the optical surface presented by the mirror. Such mirrors may be employed in surveillance systems or directed-energy weapon systems.

There are various techniques known in the art to monitor and control the figure of these segmented optical elements. Briefly, some of the prior art techniques utilize active electro-mechanical measurement and control of the "back surface" of the segmented components, while others employ aperture sharing elements such as buried gratings, corner cubes, or holographic optical elements placed on the optical surface to be controlled. These techniques generally require complex fabrication processes on large optical elements and only provide an indirect measure of mirror/segment errors. Scene based image quality panel/figure estimators are sometimes employed but the performance of this approach is impacted by scene spatial frequency characteristics and may experience scene induced sensor dropout. Center of curvature sensors are known but they, like some of the other techniques, have highly accurate alignment constraints.

The present invention is directed to solving one or more of these problems.

SUMMARY OF THE INVENTION

In accordance with the preferred embodiment of this invention, a light source is provided for generating a beam having a phase front with a desired curvature, preferably a Gaussian distribution. The curved beam is directed towards the optical surface to be sensed along a first path. Characteristics of the beam reflected from the surface of the optical element are detected to determine the relative differences between the curvatures of the beam and the optical surface.

The present invention thus measures (and hence permits control of) the optical figure of segmented reflecting optical elements by employing the properties of a Gaussian laser beam. In particular, a Gaussian laser beam is generated and directed at the optical element. The Gaussian beam optical system is designed such that when the Gaussian beam is coincident with the optical surfaces to be monitored, it has the same radius of curvature as those surfaces, and the desired area coverage. As a result of the matching of radii of curvature, the laser beam is reflected along its input path, and therefore can be used in an error/wavefront sensing device.

The inventive approach is believed to be superior to the state of the art because it does not require complex fabrication techniques associated with large optical elements, i.e., it does not require placing holographic optical elements, buried gratings, or corner cubes on the segmented elements. The inventive approach does not require accurate calibration between highly accurate back surface actuators with the front optical surface. In addition, the invention is an internal referencing technique which is not scene dependent and it measures directly the optical quality of the desired surface. Also, the extreme restrictions placed on the source location necessary with use of prior art curvature sensors is avoided by way of this invention.

BRIEF DESCRIPTION OF THE DRAWING

These and various other advantages of the present invention will become apparent to one skilled in the art upon reading the following specification and by reference to the drawing in which.

DESCRIPTION OF THE PREFERRED EMBODIMENT

Figure 1:
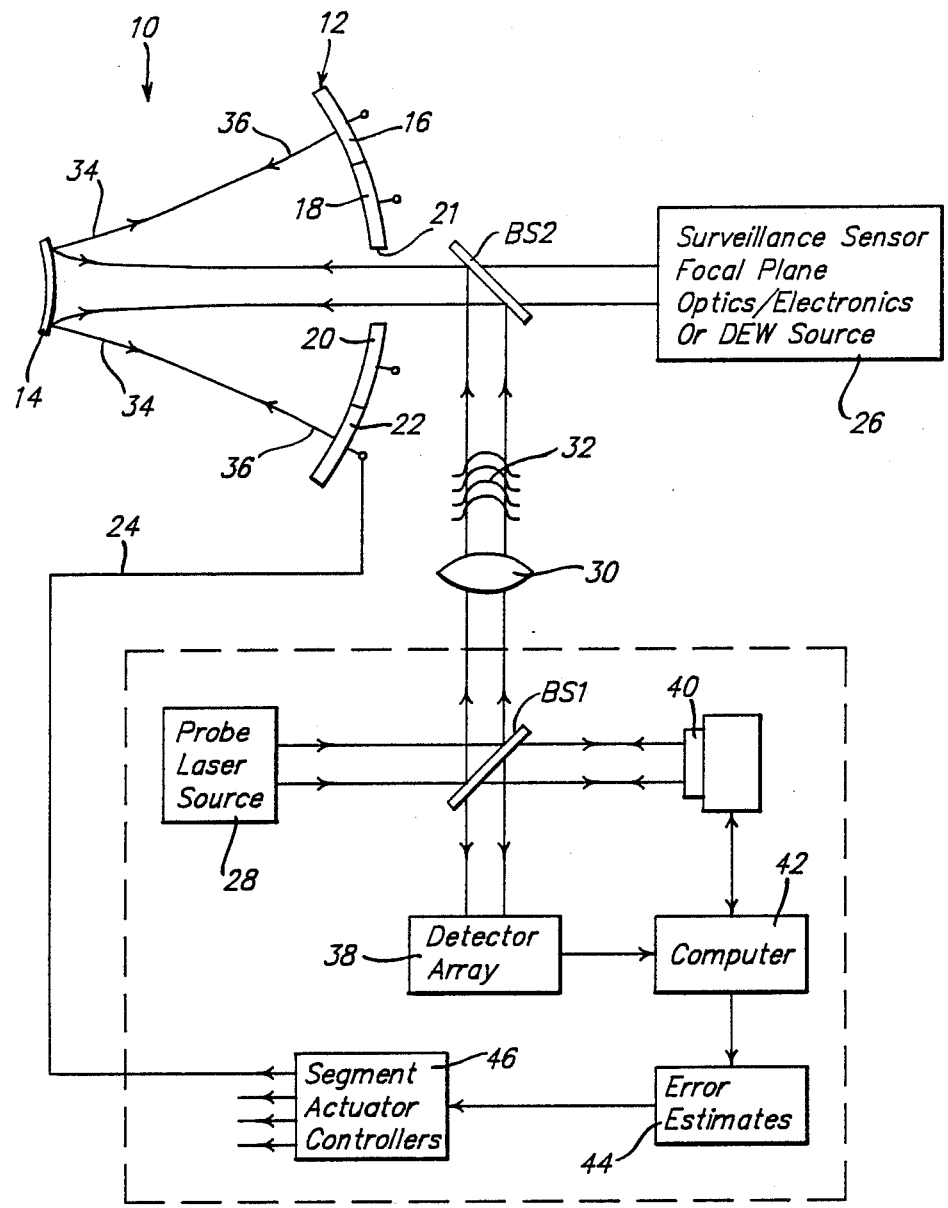
FIG. 1 is an optical block diagram of a system made in accordance with the teachings of this invention.

With reference then to the drawing, the present invention will be described in connection with measuring and controlling an optical element in a large aperture system 10 employing a segmented primary mirror 12 and a secondary mirror 14. However, it should be understood that the present invention has much wider applicability. With this caveat in mind, primary mirror 12 is formed up from a large number of segments having actuators associated therewith for deforming its associated segment into a desired shape. For simplicity sake, only four such segments 16, 18, 20 and 22 are illustrated. Such mirrors are known per se to include some suitable connection from the actuators to controllers therefor. In the drawing, one lead 24 associated with segment 22 is illustrated for that purpose. The primary mirror 12 has a centrally located aperture 21 and the secondary mirror 14 is suitably mounted in relation to primary mirror 12.

Optical system 10 can be used in a wide variety of applications. It can be used as a collector for receiving scene information and focusing it onto focal plane detectors of a surveillance sensor system generally represented by the box 26. Conversely, optical system 10 can be used to output a high energy beam from a directed energy weapon source alternatively referenced in box 26. Still other applications are apparent to those skilled in the art. Whatever application is chosen it is often necessary to either initially set or to adaptively control the figure or curvature of the reflecting surface of primary mirror 12. It is to this task that the invention is primarily directed.

Provision is made for generating a beam having a phase front with a desired curvature. In the preferred embodiment, this so-called "probe" beam is generated by a laser source 28 and curvature matching optics 30. Preferably, the probe beam has a Gaussian phase front distribution as illustrated schematically at 32. Briefly, the Gaussian probe beam 32 is generated by the fundamental mode Gaussian laser beam source 28 propagating to beamsplitter BS1, and through the curvature matching optics 30. The curvature matching optics 30 transform the Gaussian beam emanating from source 28 and reflecting off BS1 to a Gaussian beam that matches the desired curvature of the primary mirror 12 after propagation from the curvature matching optics 30 to the primary mirror 12. Thus, the radius of curvature of the probe beam matches the desired radius of curvature of the optical element to be tested, here primary mirror 12. The probe beam 32 is reflected off of beam splitter BS2 onto the reflecting surface of secondary mirror 14 and then along a first optical path 34 to the primary mirror 12. If the radii of curvature of the probe beam 32 and that of the primary mirror 12 are the same, then the beam will be reflected off of mirror 12 along an optical path 36 which is coincident with the first input optical path 34. Otherwise, there will be an error therebetween. The reflected beam reflects off of secondary mirror 14, reflects off BS2 and through beam splitter BS1 onto a conventional interferometric detector array 38. Thus, the reflected beam serves as an "object" beam for array 38. The reference beam for the interferometric system is generated by a beam passing through beam splitter BS1 and reflecting off of a controllable reference surface 40 and reflecting downwardly off of beam splitter BS1 onto the detector array 38. The controllable reference surface 40 is driven by computer 42 so that known optical path length differences can be introduced, thereby providing the means for unambiguously determining the phase front difference as measured by detector array 38. The detector array thus provides a measure of the relative differences between the curvature of the probe beam and the optical surface under test. If the curvature of mirror 12 does not match with the curvature of the probe beam 32, then an error will be detected by array 38 which error is fed through computer 42 which generates error estimates 44 used to appropriately drive controller 46. Controller 46 operates in a feedback mode to energize appropriate actuators associated with the mirror segments to reshape them into the desired curvature until the error is eliminated As noted from the outset, while this invention has been described in connection with a particular example, it is not intended to be limited to that example since various modifications will become apparent to those skilled in the art after having the benefit of reading and studying this specification, drawing and following claims.

What is claimed is:

1. In an apparatus having an optical element with a curved surface, the improvement comprising:
   light source means for generating a probe beam having a phase front with a desired curvature;
   first means for directing the curved probe beam towards the curved surface along a first path; and
   second means for detecting characteristics of the beam reflected from the surface to determine the relative differences between the curvatures of the beam and the optical surface and producing an output representative thereof.

2. The improvement of claim 1 wherein said optical surface is defined by a plurality of mirror segments having actuators associated therewith, and wherein third means are provided for driving the actuators to change the shape of the optical surface as a function of the output of the second means.

3. The improvement of claim 1 which further comprises:
   focal plane optics of a surveillance sensor positioned to receive light reflected from the optical surface.

4. The improvement of claim 1 which further comprises a directed energy weapon source for reflecting a high energy beam off of the optical surface.

5. The improvement of claim 1 wherein the light source means comprises a laser source and matching optics means for generating a generally Gaussian phase front having a desired radius of curvature.

6. The improvement of claim 1 wherein said second means includes an interferometric detector array.

7. In an optical system having a primary mirror with a centrally located aperture therein and a secondary mirror positioned relative to the primary mirror, and in which the primary mirror is formed of a plurality of segments having actuators for deforming the shape thereof to thereby define the figure of the reflecting surface of the primary mirror, the improvement comprising:
   means for using the characteristics of a generally Gaussian beam reflected off of the reflecting surface of the primary mirror to drive the actuators until the figure of the primary mirror has substantially the same radii of curvature as the beam.

8. The improvement of claim 7 wherein the Gaussian beam passes through the aperture in the primary mirror and is reflected off of the secondary mirror onto the reflecting surface of the primary mirror 9. The improvement of claim 7 which further comprises:
   detector means, disposed outside of the primary mirror aperture for receiving the beam reflected therethrough off of the mirror surfaces.

10. A method comprising:
   generating a probe beam having a phase front with a desired curvature;
   directing the probe beam along a first path to a curved surface of an optical element; and
   detecting characteristics of the probe beam reflected from the curved surface to thereby measure the relative differences between the curvatures of the beam and the optical surface.

11. The method of claim 10 wherein the probe beam is a laser beam having a generally Gaussian phase front.

12. The method of claim 10 wherein the reflected beam is coincident with the first path if the curvatures of the beam and optical surface are the same, and wherein the method further comprises:
   adaptively controlling the shape of the optical element until the reflected beam is coincident with the first path.

* * * * *